(12) United States Patent
Taherzadeh Boroujeni et al.

(10) Patent No.: US 12,402,137 B2
(45) Date of Patent: Aug. 26, 2025

(54) TIMING CONSIDERATIONS FOR DYNAMIC INDICATION OF UPLINK (UL) CHANNEL REPETITION FACTORS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Iyab Issam Sakhnini, San Diego, CA (US); Jelena Damnjanovic, Del Mar, CA (US); Junyi Li, Fairless Hills, PA (US); Jing Sun, San Diego, CA (US); Juan Montojo, San Diego, CA (US)

(*) Notice: Subject to any disclaimer, the term of this patent is extended or adjusted under 35 U.S.C. 154(b) by 513 days.

(21) Appl. No.: 17/647,293

(22) Filed: Jan. 6, 2022

(65) Prior Publication Data

US 2022/0322412 A1    Oct. 6, 2022

Related U.S. Application Data

(60) Provisional application No. 63/170,416, filed on Apr. 2, 2021.

(51) Int. Cl.
*H04W 72/23*   (2023.01)
*H04L 5/00*    (2006.01)

(52) U.S. Cl.
CPC .......... *H04W 72/23* (2023.01); *H04L 5/0055* (2013.01)

(58) Field of Classification Search
None
See application file for complete search history.

(56) References Cited

U.S. PATENT DOCUMENTS

| | | | |
|---|---|---|---|
| 2020/0359401 A1* | 11/2020 | Yoshimura | H04L 1/1819 |
| 2020/0403755 A1* | 12/2020 | Chen | H04W 72/23 |
| 2023/0104984 A1* | 4/2023 | Yin | H04L 1/1671 370/329 |
| 2023/0164762 A1* | 5/2023 | Lin | H04W 72/11 370/329 |
| 2023/0180243 A1* | 6/2023 | Chen | H04L 5/0035 370/329 |
| 2023/0388061 A1* | 11/2023 | Shen | H04L 1/1819 |

\* cited by examiner

*Primary Examiner* — Jenkey Van

(57) ABSTRACT

Certain aspects of the present disclosure provide techniques for application of a repetition factor to uplink (UL) control channels. A method that may be performed by a user equipment (UE) includes receiving, on a downlink (DL) control channel, an indication of a configuration for repetition of a UL control channel scheduled by the DL control channel and another UL control channel, wherein the configuration is applied for repetition of the other UL control channel after a configured time period starting from reception of the DL control channel; and transmitting the repetition of the UL control channel and the repetition of the other UL control channel in accordance with the configuration.

23 Claims, 9 Drawing Sheets

400

402

TRANSMIT, BY A BASE STATION (BS), ON A DOWNLINK (DL) CONTROL CHANNEL, AN INDICATION OF A CONFIGURATION FOR REPETITION OF AN UPLINK (UL) CONTROL CHANNEL SCHEDULED BY THE DL CONTROL CHANNEL AND ANOTHER UL CONTROL CHANNEL, WHEREIN THE CONFIGURATION IS APPLIED FOR REPETITION OF THE OTHER UL CONTROL CHANNEL AFTER A CONFIGURED TIME PERIOD STARTING FROM TRANSMISSION OF THE DL CONTROL CHANNEL

404

RECEIVE, BY THE BS, THE REPETITION OF THE UL CONTROL CHANNEL AND THE REPETITION OF THE OTHER UL CONTROL CHANNEL IN ACCORDANCE WITH THE CONFIGURATION

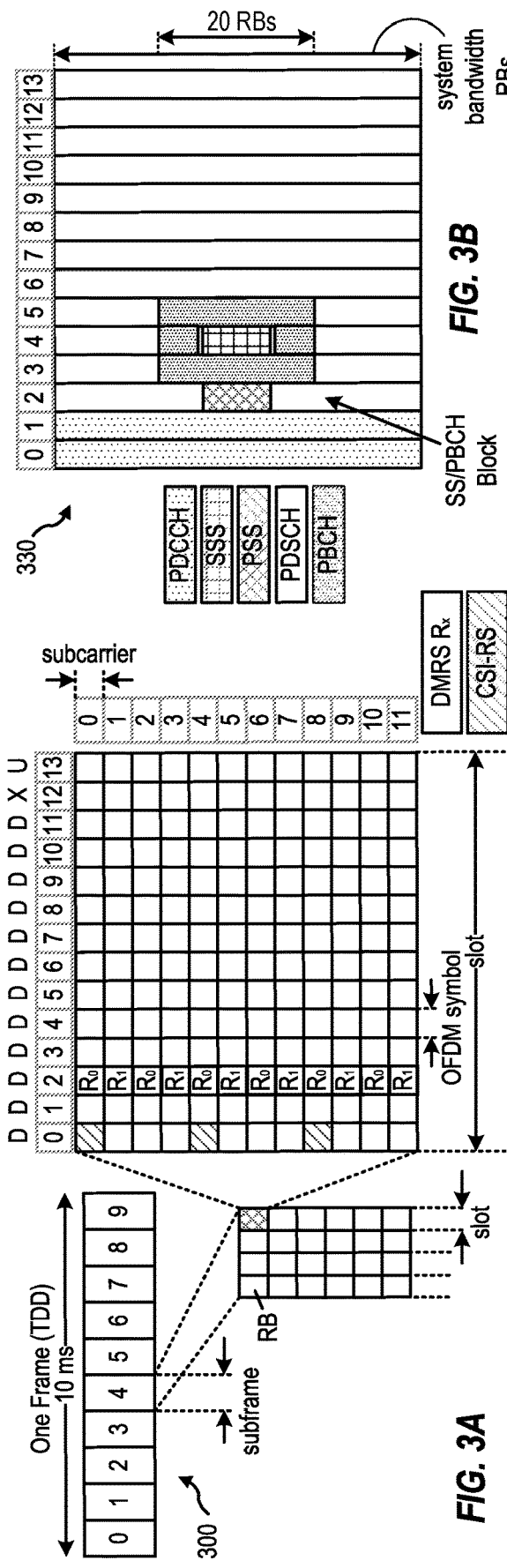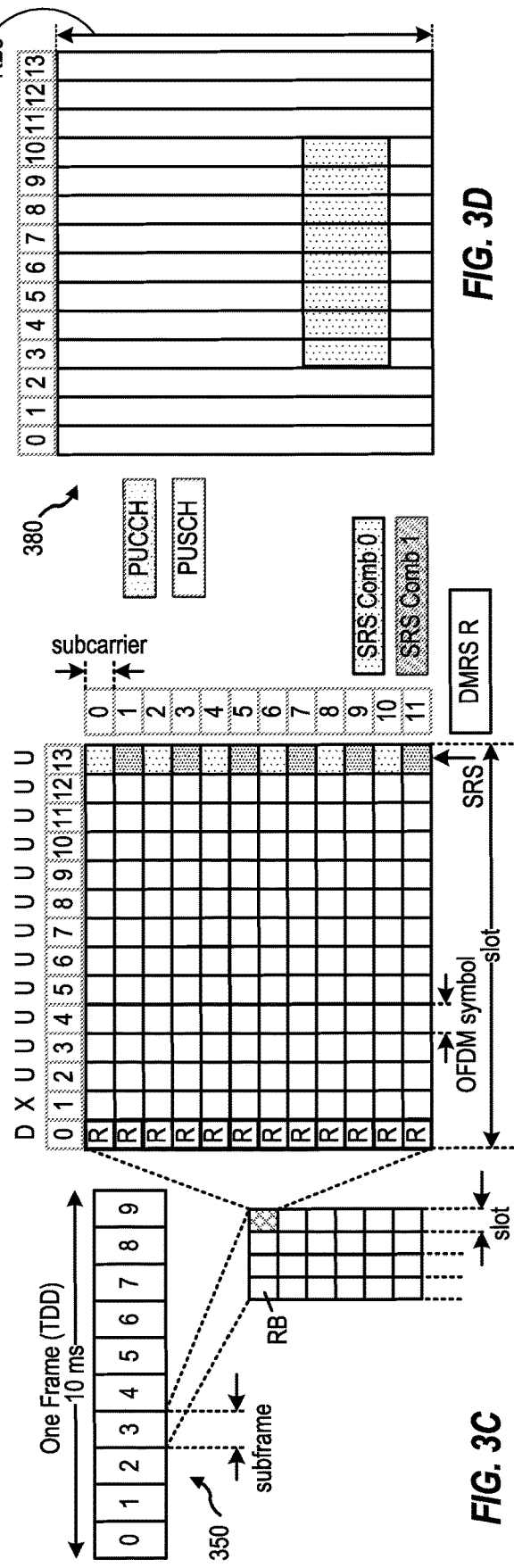

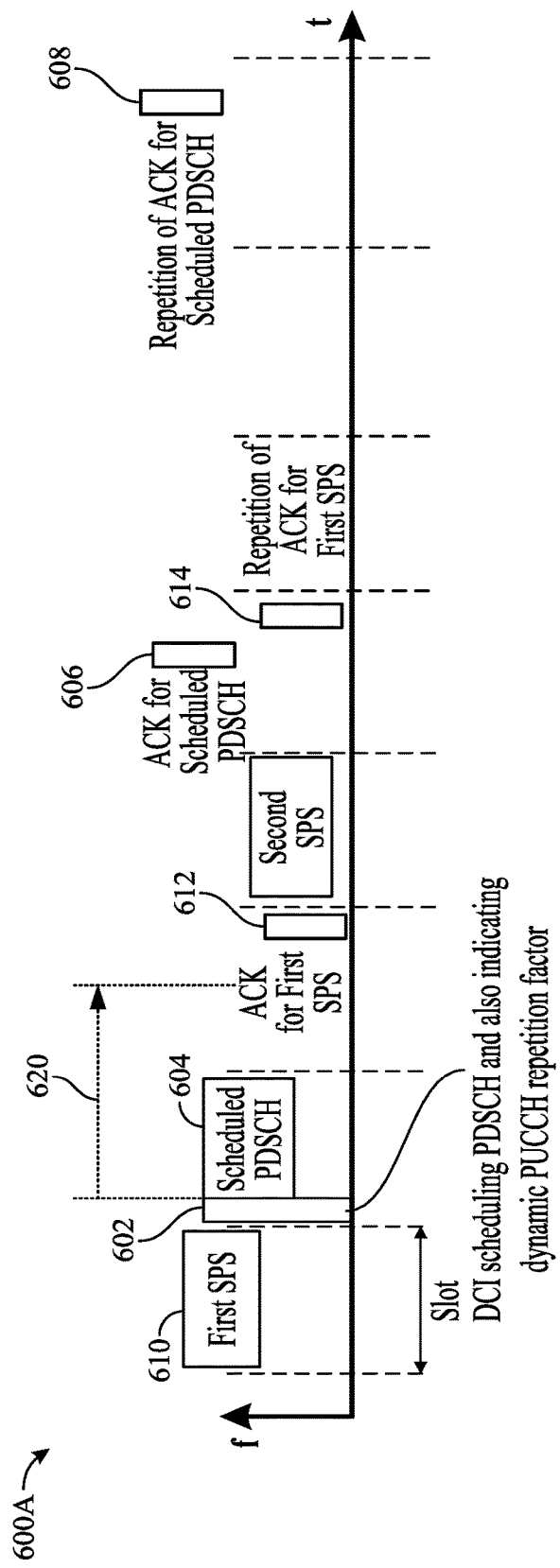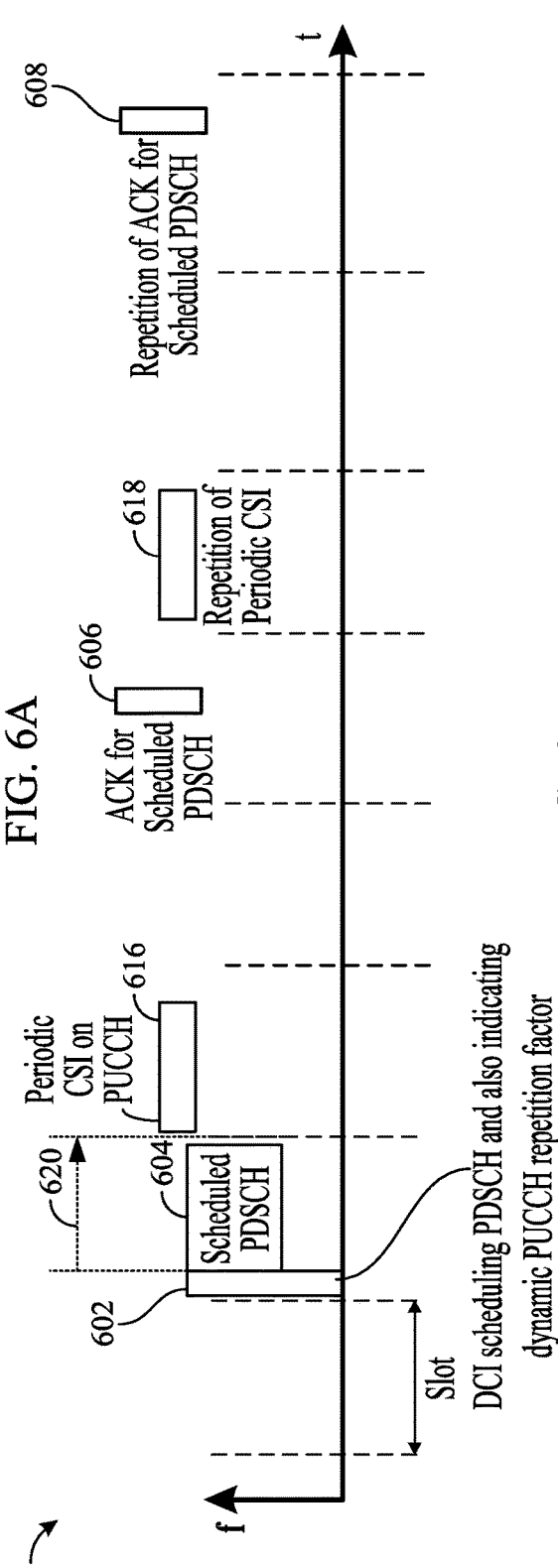
FIG. 6A
FIG. 6B

TIMING CONSIDERATIONS FOR DYNAMIC INDICATION OF UPLINK (UL) CHANNEL REPETITION FACTORS

CROSS-REFERENCE TO RELATED APPLICATION

This application claims benefit of and priority to U.S. Provisional Application No. 63/170,416 filed Apr. 2, 2021, which is assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for application of a repetition factor to uplink (UL) control channels.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE). The method generally includes: receiving, on a downlink (DL) control channel, an indication of a configuration for repetition of an uplink (UL) control channel scheduled by the DL control channel and another UL control channel, wherein the configuration is applied for repetition of the other UL control channel after a configured time period starting from reception of the DL control channel; and transmitting the repetition of the UL control channel and the repetition of the other UL control channel in accordance with the configuration.

One aspect provides a method for wireless communication by a base station (BS). The method generally includes: transmitting, on a DL control channel, an indication of a configuration for repetition of a UL control channel scheduled by the DL control channel and another UL control channel, wherein the configuration is applied for repetition of the other UL control channel after a configured time period starting from transmission of the DL control channel; and receiving the repetition of the UL control channel and the repetition of the other UL control channel in accordance with the configuration.

One aspect provides an apparatus for wireless communication by a UE. The apparatus generally includes a memory and one or more processors coupled to the memory, the memory and the one or more processors being configured to: receive, on a DL control channel, an indication of a configuration for repetition of a UL control channel scheduled by the DL control channel and another UL control channel, wherein the configuration is applied for repetition of the other UL control channel after a configured time period starting from reception of the DL control channel; and transmit the repetition of the UL control channel and the repetition of the other UL control channel in accordance with the configuration.

One aspect provides an apparatus for wireless communication by a BS. The apparatus generally includes a memory and one or more processors coupled to the memory, the memory and the one or more processors being configured to: transmit, on a DL control channel, an indication of a configuration for repetition of a UL control channel scheduled by the DL control channel and another UL control channel, wherein the configuration is applied for repetition of the other UL control channel after a configured time period starting from transmission of the DL control channel; and receive the repetition of the UL control channel and the repetition of the other UL control channel in accordance with the configuration.

One aspect provides an apparatus for wireless communication by a UE. The apparatus generally includes: means for receiving, on a DL control channel, an indication of a configuration for repetition of a UL control channel scheduled by the DL control channel and another UL control channel, wherein the configuration is applied for repetition of the other UL control channel after a configured time period starting from reception of the DL control channel; and means for transmitting the repetition of the UL control channel and the repetition of the other UL control channel in accordance with the configuration.

One aspect provides an apparatus for wireless communication by a BS. The apparatus generally includes means for transmitting, on a DL control channel, an indication of a configuration for repetition of a UL control channel scheduled by the DL control channel and another UL control channel, wherein the configuration is applied for repetition of the other UL control channel after a configured time period starting from transmission of the DL control channel; and means for receiving the repetition of the UL control channel and the repetition of the other UL control channel in accordance with the configuration.

One aspect provides a non-transitory computer-readable medium comprising executable instructions that, when executed by one or more processors of a UE, cause the UE to: receive, on a DL control channel, an indication of a configuration for repetition of a uplink control channel scheduled by the DL control channel and another UL control channel, wherein the configuration is applied for repetition of the other UL control channel after a configured time period starting from reception of the DL control channel; and transmit the repetition of the UL control channel and the repetition of the other UL control channel in accordance with the configuration.

One aspect provides a non-transitory computer-readable medium comprising executable instructions that, when executed by one or more processors of a BS, cause the BS to: transmit, on a DL control channel scheduled by the DL control channel and another UL control channel, an indication of a configuration for repetition of a UL control channel, wherein the configuration is applied for repetition of the other UL control channel after a configured time period starting from transmission of the DL control channel; and receive the repetition of the UL control channel and the repetition of the other UL control channel in accordance with the configuration.

One aspect provides a computer program product embodied on a computer-readable storage medium comprising code for receiving, on a DL control channel, an indication of a configuration for repetition of a UL control channel scheduled by the DL control channel and another UL control channel, wherein the configuration is applied for repetition of the other UL control channel after a configured time period starting from reception of the DL control channel; and code for transmitting the repetition of the UL control channel and the repetition of the other UL control channel in accordance with the configuration.

One aspect provides a computer program product embodied on a computer-readable storage medium comprising code for transmitting, on a DL control channel, an indication of a configuration for repetition of a UL control channel scheduled by the DL control channel and another UL control channel, wherein the configuration is applied for repetition of the other UL control channel after a configured time period starting from transmission of the DL control channel; and code for receiving the repetition of the UL control channel and the repetition of the other UL control channel in accordance with the configuration.

By way of example, the apparatuses described above may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communications system.

FIGS. 6A and 6B illustrate example scenarios for application of a repetition factor carried in downlink control information (DCI) to an uplink (UL) control channel that is unassociated with the DCI, in accordance with certain aspects of the present disclosure

DETAILED DESCRIPTION

Aspects of the present disclosure provide apparatuses, methods, processing systems, and computer-readable mediums for application of a repetition factor to uplink (UL) control channels. For example, a UL control channel repetition factor may be applied to both a UL control channel scheduled by a downlink control channel (DCI) carrying the repetition factor and a UL control channel unassociated with the DCI carrying the repetition factor (referred to herein as an "unassociated UL control channel" or "other UL control channel"). For example, the unassociated UL control channel may be a physical uplink control channel (PUCCH) carrying acknowledgement (ACK) or negative ACK (NACK) feedback for a semi-persistent scheduled (SPS) physical downlink shared channel (PDSCH) or a PUCCH carrying periodic channel state information (P-CSI). A UL control channel is considered unassociated with a DCI if the DCI does not schedule the UL control channel.

According to certain aspects, the dynamic indication of a UL control channel repetition factor by a DCI (or the DL control channel carrying DCI) may be applied to a UL control channel unassociated with that DCI only after a configured time period (also referred to herein as "processing time") starting from reception of the DCI. The configured time may be defined such that a user equipment (UE) has enough time to decode the repetition factor and implement the repetition for the unassociated UL control channel. Providing the UE sufficient time to apply the repetition to the unassociated UL control channel facilitates the repetition being applied for the unassociated UL control channel such that coverage and reliability of the unassociated UL channel is increased. In particular, transmitting multiple repetitions of the unassociated UL control channel may increase the likelihood of a network entity receiving the unassociated channel. Moreover, the aspects described herein reduce signaling overhead by using a DCI for scheduling one UL control channel to also configure a repetition for another UL control channel. Some aspects described herein provide techniques for setting this configured time period.

Introduction to Wireless Communication Networks

Figure 1:
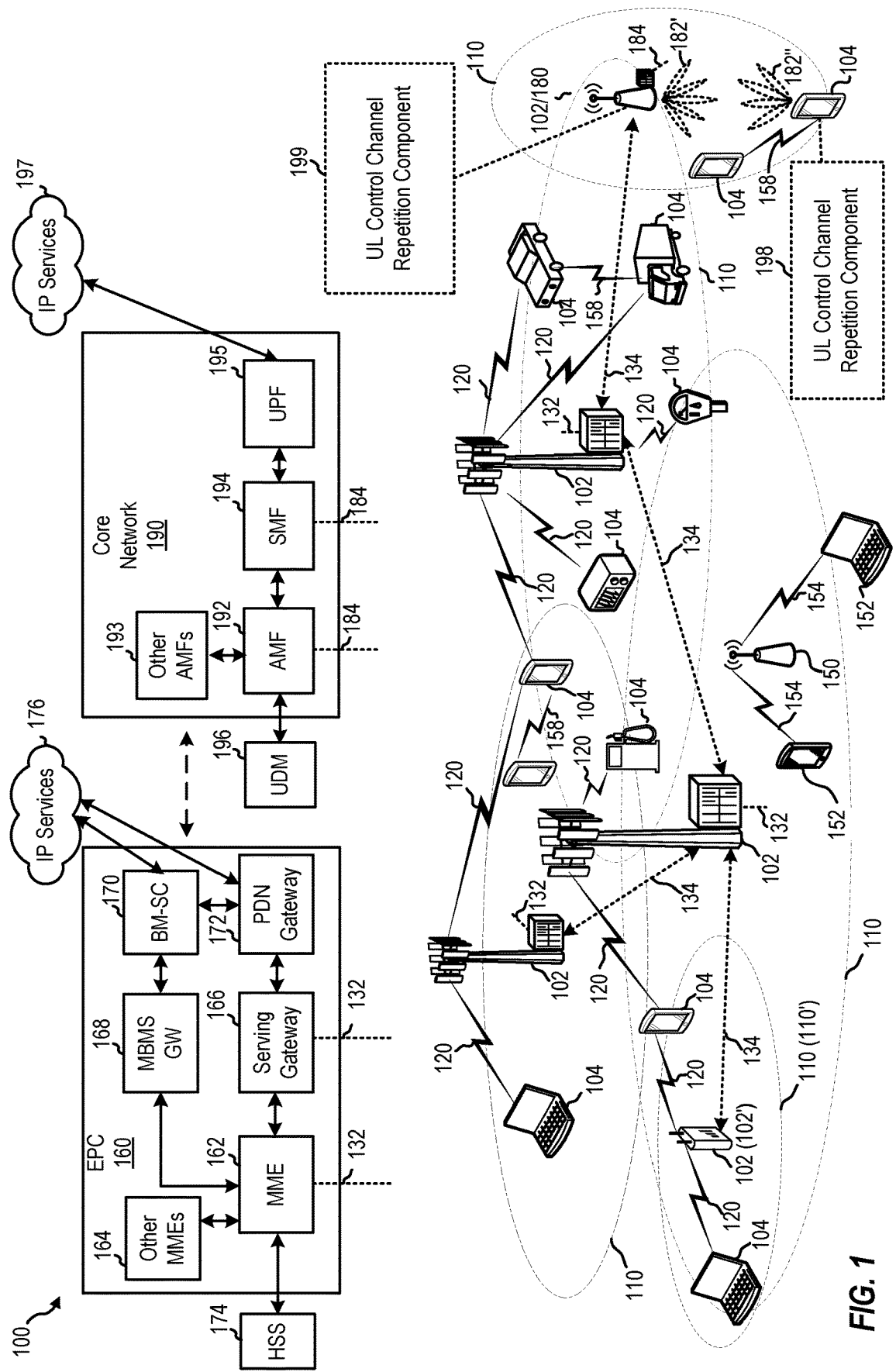
FIG. 1 is a block diagram conceptually illustrating an example wireless communications system.

FIG. 1 depicts an example of a wireless communications system 100, in which aspects described herein may be implemented.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

BSs 102 may provide an access point to the EPC 160 and/or core network 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs may include and/or be referred to as a gNB, Node B, eNB, an access point, a base transceiver station, a radio BS, a radio transceiver, or a transceiver function, or a transmit reception point (TRP) in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs 102).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communications system 100 includes an uplink (UL) control channel repetition component 199, which may be configured to receive a repetition of a UL control channel. Wireless communications system 100 further includes UL control channel repetition component 198, which may be configured to transmit a repetition of a UL control channel.

Figure 2:
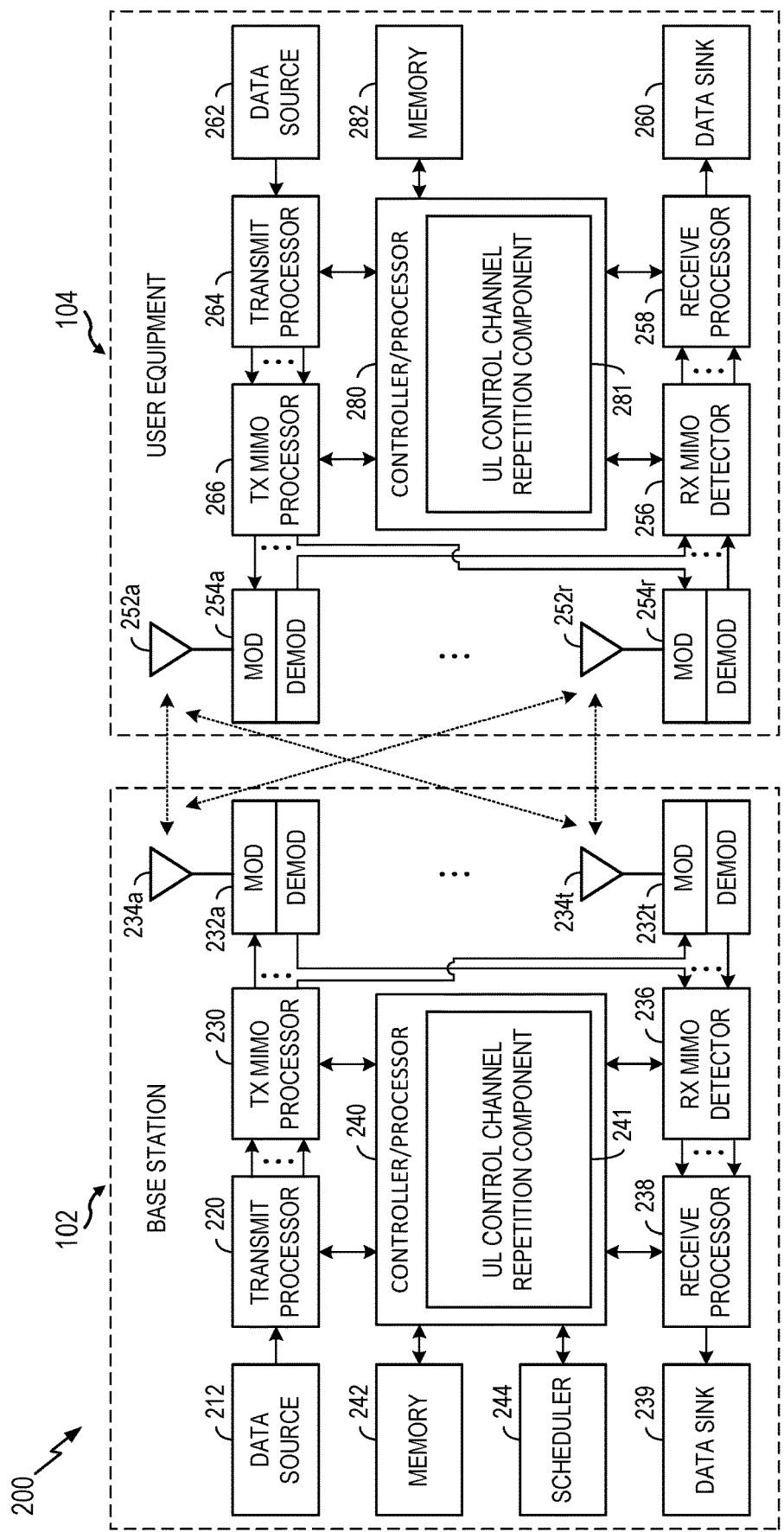
FIG. 2 is a block diagram conceptually illustrating aspects of an example a base station (BS) and user equipment (UE).

FIG. 2 depicts aspects of an example BS 102 and a UE 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes UL control channel repetition component 241, which may be representative of UL control channel repetition component 199 of FIG. 1. Notably, while depicted as an aspect of controller/processor 240, UL control channel repetition component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes UL control channel repetition component 281, which may be representative of UL control channel repetition component 198 of FIG. 1. Notably, while depicted as an aspect of controller/processor 280, UL control channel repetition component 281 may be implemented additionally or alternatively in various other aspects of UE 104 in other implementations.

FIGS. 3A-3D depict aspects of data structures for a wireless communication network, such as wireless communications system 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Timing Considerations for Dynamic Indication of Uplink (UL) Channel Repetition Factors Some aspects of the present disclosure are directed to coverage enhancement techniques for an uplink (UL) control channel (e.g., a physical uplink control channel (PUCCH)). A signaling mechanism may be used to support a dynamic indication of a UL control channel repetition factor. The UL control channel repetition factor may be explicitly or implicitly indicated in downlink control information (DCI) that schedules a physical downlink shared channel (PDSCH). For example, a UL control channel resource indicator (e.g., a PUCCH RI (PRI)) of the scheduling DCI may indicate a UL control channel resource set configured for repetition, the resource set being mapped to a UL control channel for which the repetition factor is to be applied.

The UL control channel repetition factor may indicate whether a UL control channel should be repeated, as well as other information, such as, the number of repetitions to be used. In some implementations, demodulation reference signal (DMRS) bundling across UL control channel repetitions may be used to enhance coverage.

According to some aspects of the present disclosure, the UL control channel repetition factor explicitly or implicitly indicated in DCI may configure repetition of a UL control channel scheduled separately from the DCI, in other words, a UL control channel unassociated with the DCI (referred to herein as an "unassociated UL control channel" or "other UL control channel"). In some cases, the unassociated UL control channel may carry acknowledgement (ACK) or negative ACK (NACK) for a downlink (DL) data channel configured using semi-persistent scheduling (SPS). In some cases, the unassociated UL control channel may carry periodic channel state information (P-CSI). In some cases, the unassociated UL control channel may include a UL control channel carrying a scheduling request (SR).

Given that the repetition factor is to be applied, to at least, a UL control channel not associated with the DCI, processing time for dynamic indication of the repetition factor may be defined to ensure a user equipment (UE) has enough time to decode the repetition factor and implement the repetition for the unassociated UL control channel. For example, as is known in the art, dynamic scheduling timing, K0, is an offset between a DL slot where a DL control channel (e.g., a physical downlink control channel (PDCCH) carrying DCI) for DL scheduling is received and the DL slot where PDSCH data is scheduled. Accordingly, a UE may not be required to decode the DCI until time K0, and the UE may not be aware of the repetition factor to apply to an unassociated UL control channel until time K0. However, if there is a UL control channel in the same time slot for which the repetition factor is to be applied, the UE may not have enough time to implement repetition for the UL control channel, and in some cases, may not be aware that UL control channel repetition is to be applied to this UL control channel. Thus, multiple repeated UL control channels may not be transmitted, and coverage and/or reliability of the UL control channel may not be improved.

Some aspects of the present disclosure are directed to techniques for applying a UL control channel repetition factor in a DCI (e.g., a DCI carried in a DL control channel) to an unassociated UL control channel. For example, the unassociated UL control channel may be a PUCCH carrying ACK/NACK feedback for an SPS PDSCH or a PUCCH carrying P-CSI. The dynamic indication of a UL control channel repetition factor by the DCI (or the DL control channel carrying DCI) may be applied to the unassociated UL control channel after a predefined or preconfigured period. The predefined or preconfigured period of time may be referred to herein as the processing time for the dynamic indication of the UL control channel repetition factor. The UL control channel repetition factor may also be applied to a UL control channel scheduled by the DCI.

Figure 4:
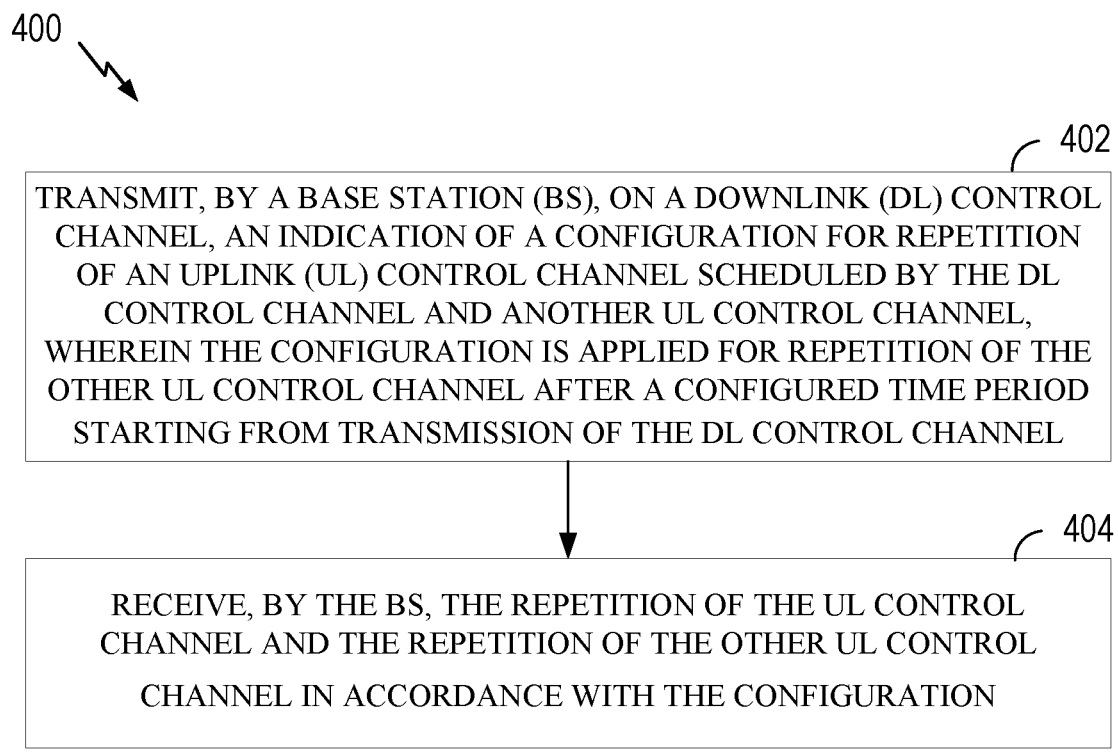
FIG. 4 is a flow diagram illustrating example operations for wireless communication by a BS, in accordance with certain aspects of the present disclosure.

FIG. 4 is a flow diagram illustrating example operations 400 for wireless communication by a base station (BS), in accordance with certain aspects of the present disclosure. Operations 400 may be performed, for example, by BS 102 in wireless communications system 100.

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 400 may begin, at block 402, with the BS transmitting, on a DL control channel, an indication of a configuration for repetition of a UL control channel scheduled by the DL control channel and another UL control channel, wherein the configuration is applied for repetition of the other UL control channel after a configured time period (e.g., also referred to herein as a "processing time") starting from transmission of the DL control channel. At block 404, the BS receives the repetition of the UL control channel and the repetition of the other UL control channel in accordance with the configuration.

Figure 5:
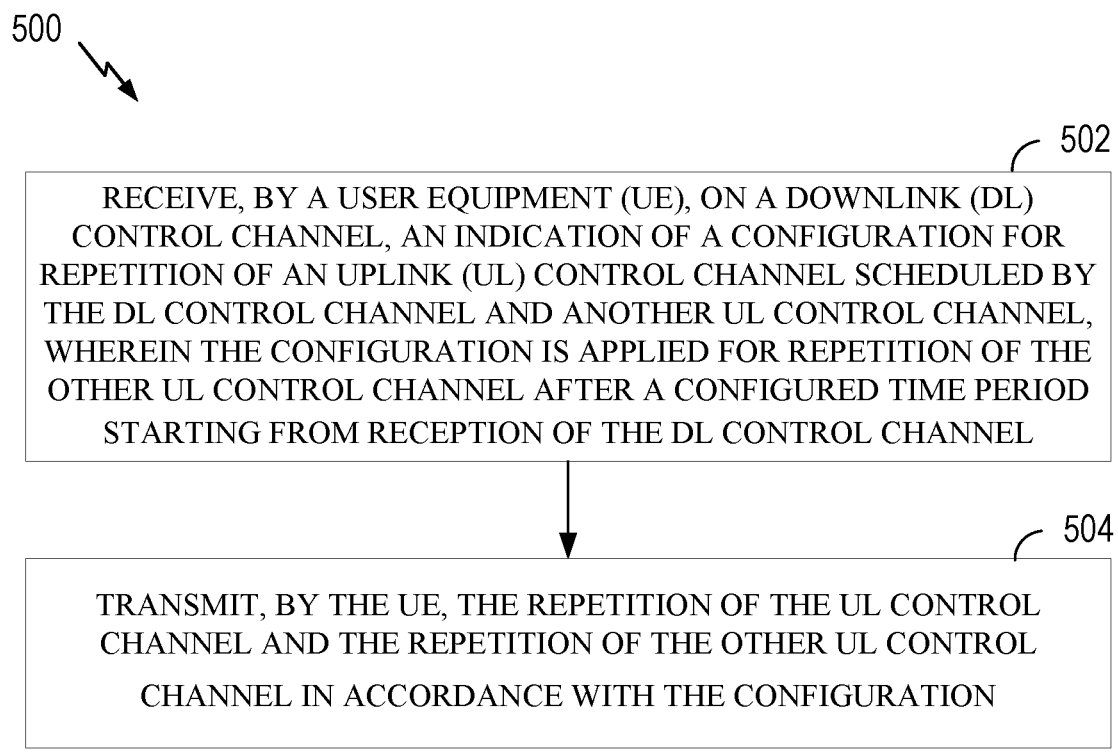
FIG. 5 is a flow diagram illustrating example operations for wireless communication by a UE, in accordance with certain aspects of the present disclosure.

FIG. 5 is a flow diagram illustrating example operations 500 for wireless communication by a UE, in accordance with certain aspects of the present disclosure. Operations 500 may be performed, for example, by UE 104 in wireless communications system 100.

Operations 500 may be complementary operations by the UE to the operations 400 performed by the BS. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 500 may begin, at block 502, with the UE receiving, on a DL control channel, an indication of a configuration for repetition of a UL control channel scheduled by the DL control channel and another UL control channel, wherein the configuration is applied for repetition of the other UL control channel after a configured time period (e.g., processing time for the dynamic indication of the UL control channel repetition factor) starting from reception of the DL control channel. In some aspects, the other UL control channel is scheduled using an indication received separately from the DL control channel. In some aspects, the other UL control channel may be a UL control channel carrying ACK or NACK for a DL data channel configured using SPS. In some aspects, the other UL control channel may be a UL control channel carrying P-CSI. At block 504, the UE transmits the repetition of the UL control channel and the repetition of the other UL control channel in accordance with the configuration.

Figure 7:
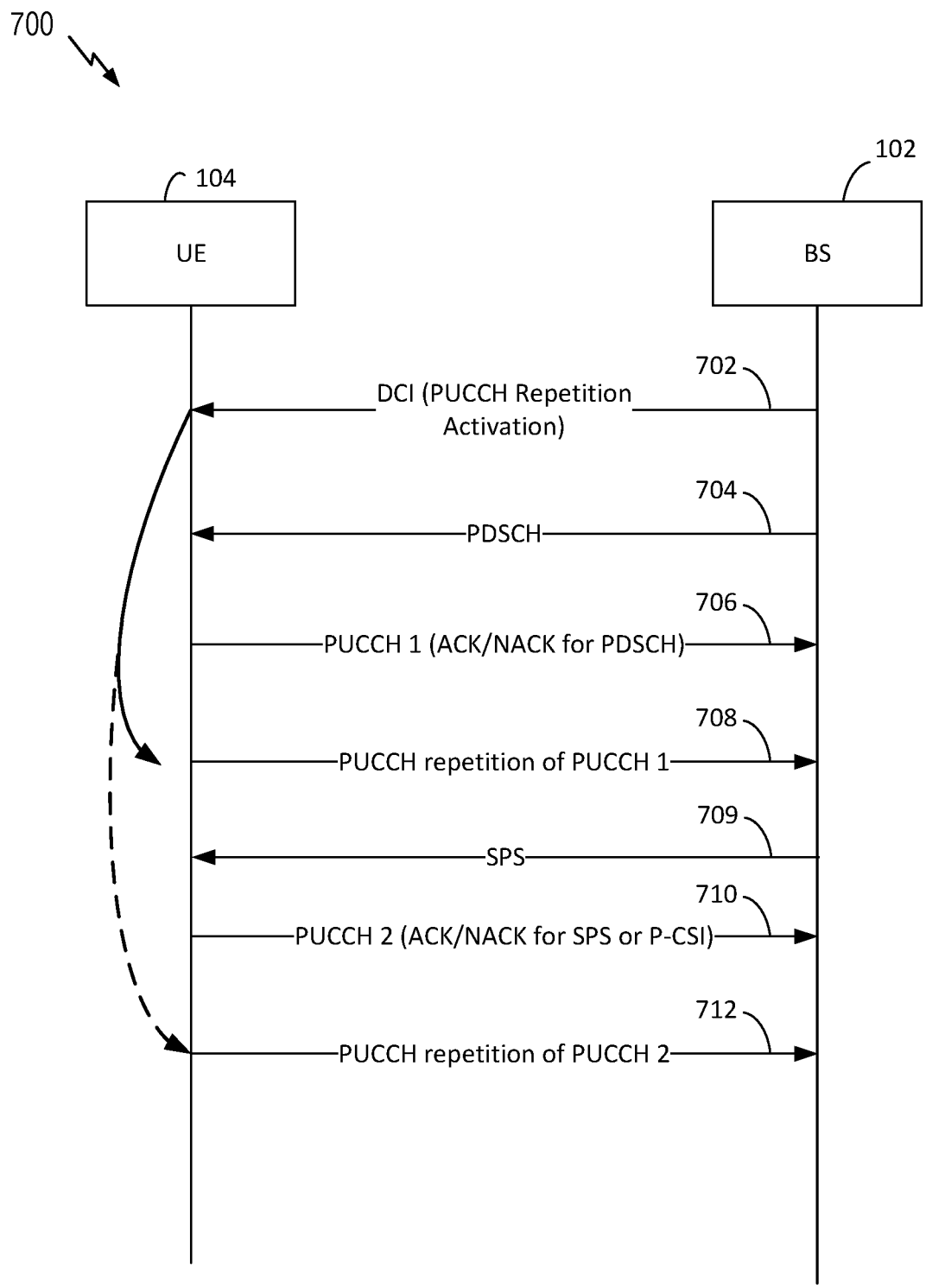
FIG. 7 is a call flow diagram illustrating application of a repetition factor to a UL control channel, in accordance with certain aspects of the present disclosure

Operations 400 and 500 of FIGS. 4 and 5, respectively, may be described in more detail with respect to FIGS. 6A, 6B, and 7.

FIGS. 6A and 6B illustrate example scenarios 600A and 600B, respectively, for application of a repetition factor carried in DCI to a UL control channel that is unassociated with the DCI, in accordance with certain aspects of the present disclosure. As shown in FIG. 6A, a UE may receive DCI 602 which schedules a DL data channel 604 (e.g., PDSCH), and may also include a dynamic UL control channel (e.g., PUCCH) repetition factor for the DL data channel 604. For example, the DCI 602 may indicate whether UL control channel 606 (e.g., PUCCH) used to provide ACK or NACK feedback for DL data channel 604 is to be repeated (e.g., as well as a number of repetitions to be used). If repetition for UL control channel 606 is activated, resources 608 may be configured for the repetition. Moreover, where the UE is configured with multiple SPS configurations (e.g., via radio resource control (RRC) signaling), the DCI 602 may also include a dynamic UL control channel (e.g., PUCCH) repetition factor for a UL control channel carrying ACK/NACK feedback for a DL data channel configured using SPS. As shown in FIG. 6A, the UE may receive a first SPS transmission 610 and transmit a UL control channel 612 for ACK/NACK feedback for the first SPS transmission 610. The DCI 602 may include a configuration for repetition of the UL control channel 606, which may also be applied for repetition of UL control channel 612. In this case, the repetition for UL control channel 606 may only be applied after a processing time 620 (e.g., configured time period) starting from reception of the DCI 602, and resources 614 may be configured for this repetition. While FIG. 6A illustrates transmission of the first SPS transmission 610 prior to the indication of the repetition factor in DCI 602, the first SPS transmission 610 may be transmitted after DCI 602 in some cases. According to some aspects described herein, a timing of the SPS DL data channel may have an impact on processing time 620 of the repetition factor. For example, if the first SPS transmission 610 is before DCI 602, one processing time 620 may be applied, and if the first SPS transmission 610 is after DCI 602, a different processing time 620 may be applied.

As shown in FIG. 6B, a UE may be configured for P-CSI reporting (e.g., via RRC signaling) which is used to periodically report CSI. Where the UE is configured for P-CSI reporting, the UL control channel (e.g., PUCCH) repetition factor carried in DCI 602 may also configure repetition for a UL control channel carrying the P-CSI. As shown in FIG. 6B, in accordance with a CSI reporting configuration, the UE may transmit a UL control channel 616 for P-CSI reporting. If the repetition factor in DCI 602 configures repetition of UL control channel 616, repetition may be applied after a processing time 620 starting from reception of the DCI 602, and resources 618 may be configured for the repetition.

According to aspects of the present disclosure, various options may be considered for determining the processing time (e.g., configured time period) prior to application of the UL control channel repetition factor to an unassociated UL control channel. In some aspects, the processing time may be dependent on the content of the unassociated UL control channel. For example, the processing time may be different for an unassociated UL control channel carrying ACK/NACK feedback for a DL data channel configured using SPS than for an unassociated UL control channel carrying P-CSI.

In some aspects, where a UE receives an indication of a UL control channel resource set to be used for transmission of the unassociated UL control channel, the processing time may be dependent on the UL control channel resource set. In some examples, the configuration of the UL control channel resource set indicates (e.g., either explicitly or implicitly) the processing time, allowing the UE to know when to begin applying the repetition factor to the unassociated UL control channel.

In some aspects, the processing time may be dependent on a format of the unassociated UL control channel. For example, the processing time may depend on whether the unassociated UL control channel is transmitted using a UL control channel format 0, 1, 2, etc. (e.g., PUCCH format 0, 1, 2, etc.). In some cases, the processing time may be different for each of the various formats. In some cases, the processing time may be the same for one or more of the various formats.

In some aspects, the processing time may be configured as a quantity of slots, a quantity of symbols (e.g., orthogonal frequency division multiplexed (OFDM) symbols), and/or absolute time (e.g., in terms of milliseconds (ms)).

In some aspects, the processing time may be dependent on a capability of the UE. For example, the configured time period may be shorter for a UE capable of faster processing (e.g., decoding) than a UE with slower processing times.

In some aspects, where the unassociated UL control channel (e.g., ACK/NACK feedback for an SPS DL data channel) is for an SPS DL data channel, the processing time may be based on a timing associated with reception of the DL data channel. For example, the processing time may be based on whether the SPS DL data channel was received prior to receiving the DCI (as shown in FIG. 6A) or after receiving the DCI.

In some aspects, the processing time may be defined in standard specifications (e.g., 3rd Generation Partnership Project (3GPP) Specifications). For example, the processing time may be dependent on at least one of a frequency range (e.g., frequency range 1 (FR1) or frequency range 2 (FR2)), frequency band, or subcarrier spacing (SCS) associated with the unassociated UL control channel.

FIG. 7 is a call flow diagram 700 illustrating application of a repetition factor to a UL control channel, in accordance with certain aspects of the present disclosure. As shown, UE 104 may receive, from BS 102, DCI 702 scheduling reception of DL data channel 704. UE 104 may also transmit a UL control channel 706 for ACK/NACK feedback of DL data channel 704. DCI 702 may activate repetition for UL control channel 706, and UE 104 may transmit a UL control channel 708 for repetition of UL control channel 706. According to aspects described herein, DCI 702 may also activate repetition for a UL control channel 710 scheduled separately from the DCI 702 (e.g., an unassociated UL control channel).

Accordingly, UE 104 may transmit a UL control channel 712 for repetition of the UL control channel 710. For example, UL control channel 710 may be a UL channel configured for CSI reporting. As another example, the UL control channel 710 may carry ACK or NACK for a DL data channel 709 configured using SPS.

Example Wireless Communication Devices

Figure 8:
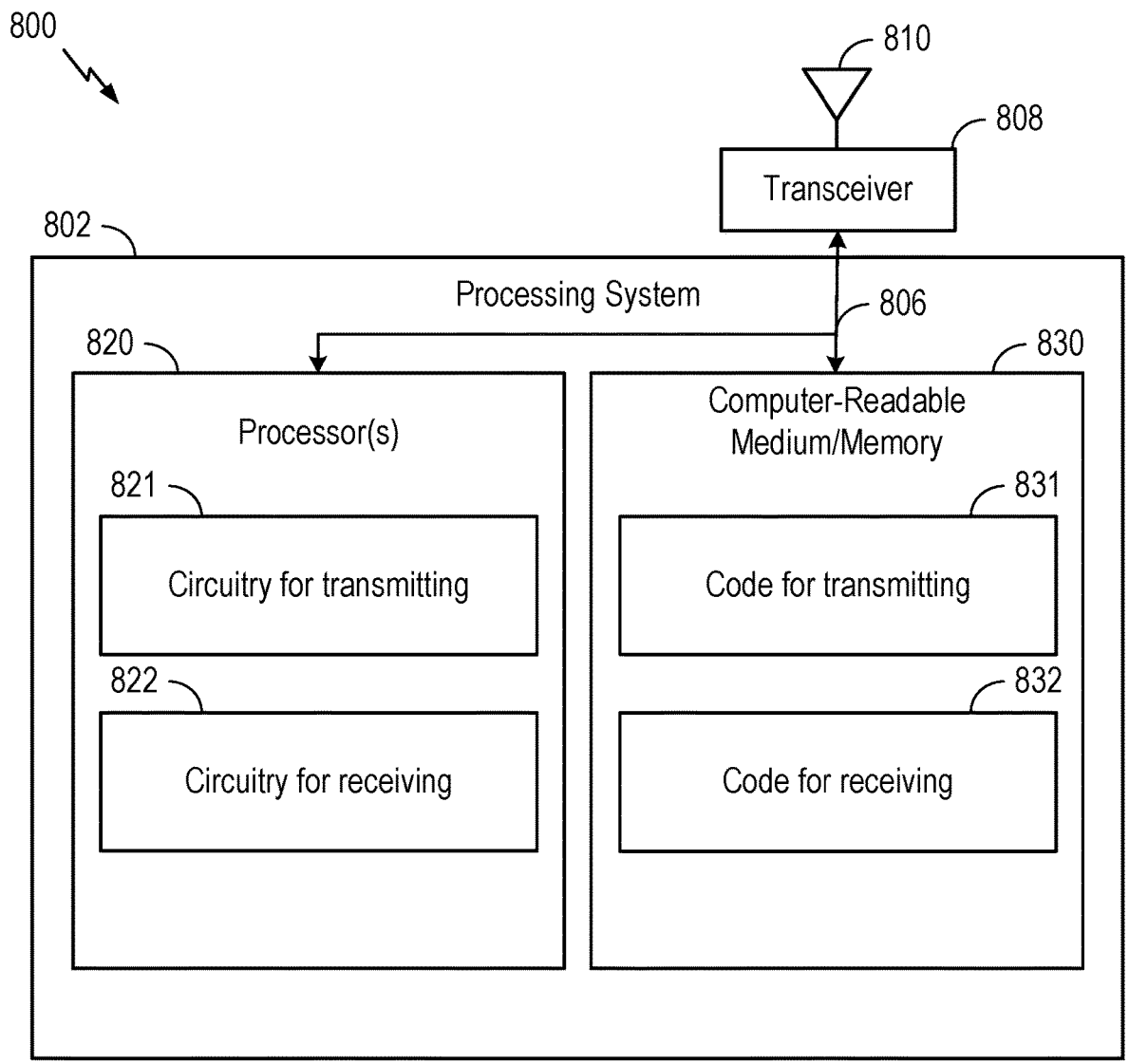
FIGS. 8 and 9 depict aspects of example communications devices.

FIG. 8 depicts an example communications device 800 that includes various components operable, configured, or adapted to perform operations for the techniques disclosed herein, such as the operations depicted and described with respect to FIGS. 4, 6A, 6B, and 7. In some examples, communications device 800 may be a base station (BS) 102 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIGS. 4, 6A, 6B, and 7, or other operations for performing the various techniques discussed herein for UL control channel repetition.

In the depicted example, computer-readable medium/memory 830 stores code 831 for transmitting; and code 832 for receiving.

In certain aspects, code 831 for transmitting may include code for transmitting, on a downlink (DL) control channel, an indication of a configuration for repetition of an uplink (UL) control channel scheduled by the DL control channel and another UL control channel. In certain aspects, code 832 for receiving may include code for receiving the repetition of the UL control channel and the repetition of the other UL control channel.

In the depicted example, the one or more processors 820 include circuitry configured to implement the code stored in the computer-readable medium/memory 830, including circuitry 821 for transmitting; and circuitry 822 for receiving.

In certain aspects, circuitry 821 for transmitting may include circuitry for transmitting, on a downlink (DL) control channel, an indication of a configuration for repetition of an uplink (UL) control channel scheduled by the DL control channel and another UL control channel. In certain aspects, circuitry 822 for receiving may include circuitry for receiving the repetition of the UL control channel and the repetition of the other UL control channel.

Various components of communications device 800 may provide means for performing the methods described herein, including with respect to FIGS. 4, 6A, 6B, and 7.

In some examples, means for transmitting or sending (or means for outputting for transmission) may include transceivers 232 and/or antenna(s) 234 of BS 102 illustrated in FIG. 2 and/or transceiver 808 and antenna 810 of communications device 800 in FIG. 8.

In some examples, means for receiving (or means for obtaining) may include transceivers 232 and/or antenna(s)

234 of BS 102 illustrated in FIG. 2 and/or transceiver 808 and antenna 810 of communications device 800 in FIG. 8.

In some examples, means for transmitting and means for receiving may include various processing system components, such as: one or more processors 820 in FIG. 8, or aspects of BS 102 depicted in FIG. 2, including receive processor 238, transmit processor 220, TX MIMO processor 230, and/or controller/processor 240 (including UL control channel repetition component 241).

Notably, FIG. 8 is just one use example, and many other examples and configurations of communications device 800 are possible.

Figure 9:
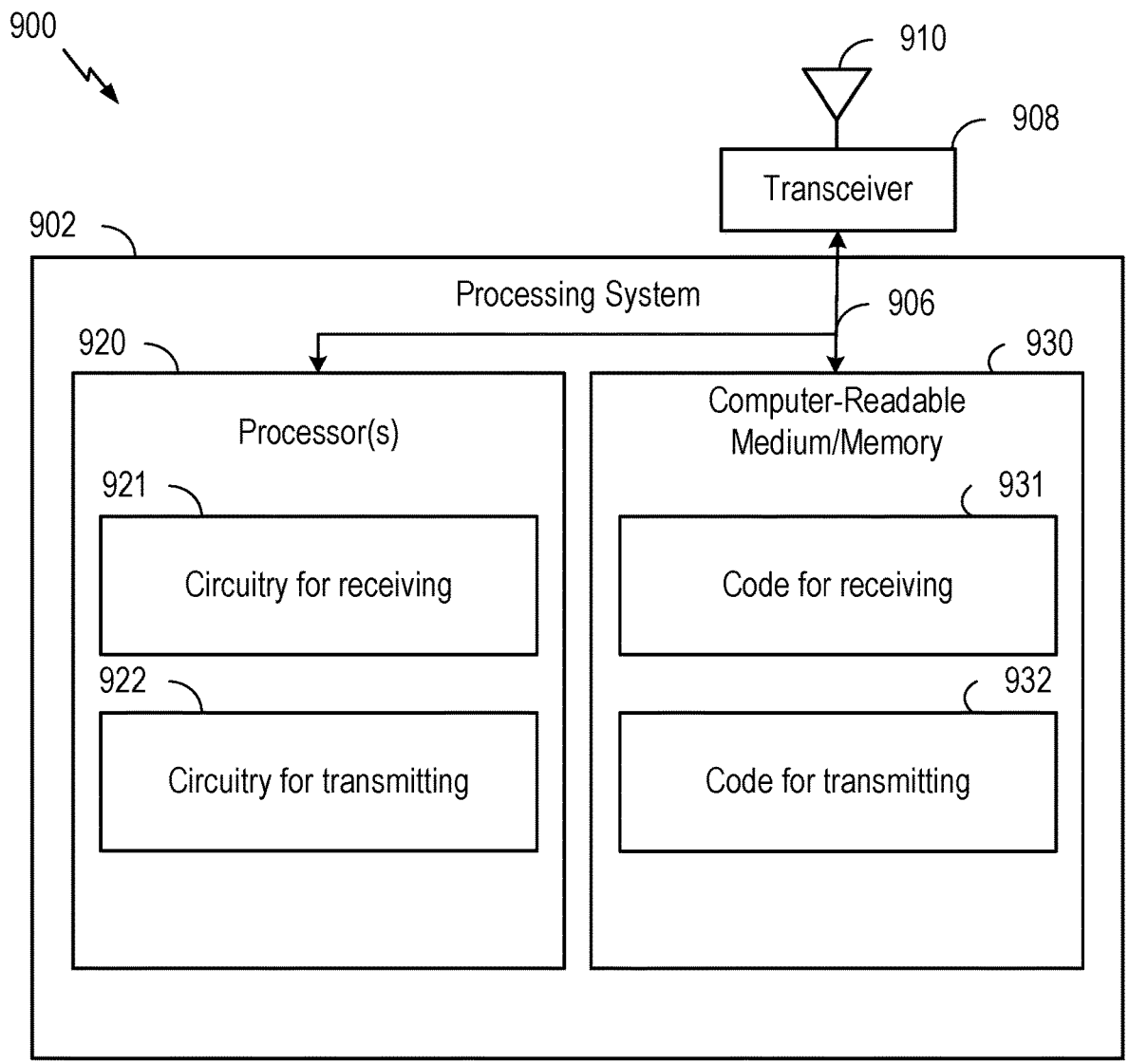

FIG. 9 depicts an example communications device 900 that includes various components operable, configured, or adapted to perform operations for the techniques disclosed herein, such as the operations depicted and described with respect to FIGS. 5, 6A, 6B, and 7. In some examples, communications device 900 may be a user equipment (UE) 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 5, 6A, 6B, and 7, or other operations for performing the various techniques discussed herein for UL control channel repetition.

In the depicted example, computer-readable medium/memory 930 stores code 931 for receiving; and code 932 for transmitting.

In certain aspects, code 931 for receiving may include code for receiving, on a DL control channel, an indication of a configuration for repetition of a UL control channel scheduled by the DL control channel and another UL control channel. In certain aspects, code 932 for transmitting may include code for transmitting the repetition of the UL control channel and the repetition of the other UL control channel.

In the depicted example, one or more processors 920 include circuitry configured to implement the code stored in the computer-readable medium/memory 930, including circuitry 921 for receiving; and circuitry 922 for transmitting.

In certain aspects, circuitry 921 for receiving may include circuitry for receiving, on a DL control channel, an indication of a configuration for repetition of a UL control channel scheduled by the DL control channel and another UL control channel. In certain aspects, circuitry 922 for transmitting may include circuitry for transmitting the repetition of the UL control channel and the repetition of the other UL control channel.

Various components of communications device 900 may provide means for performing the methods described herein, including with respect to FIGS. 5, 6A, 6B, and 7.

In some examples, means for transmitting or sending (or means for outputting for transmission) may include the transceivers 254 and/or antenna(s) 252 of UE 104 illustrated in FIG. 2 and/or transceiver 908 and antenna 910 of communications device 900 in FIG. 9.

In some examples, means for receiving (or means for obtaining) may include transceivers 254 and/or antenna(s) 252 of UE 104 illustrated in FIG. 2 and/or transceiver 908 and antenna 910 of communications device 900 in FIG. 9.

In some examples, means for transmitting and means for receiving may include various processing system components, such as: one or more processors 920 in FIG. 9, or aspects of UE 104 depicted in FIG. 2, including receive processor 258, transmit processor 264, TX MIMO processor 266, and/or controller/processor 280 (including UL control channel repetition component 281).

Notably, FIG. 9 is just use one example, and many other examples and configurations of communications device 900 are possible.

Example Clauses

Implementation examples are described in the following numbered clauses:

Clause 1. A method for wireless communication by a user equipment (UE), comprising: receiving, on a downlink (DL) control channel, an indication of a configuration for repetition of an uplink (UL) control channel scheduled by the DL control channel and another UL control channel, wherein the configuration is applied for repetition of the other UL control channel after a configured time period starting from reception of the DL control channel; and transmitting the repetition of the UL control channel and the repetition of the other UL control channel in accordance with the configuration.

Clause 2. The method of Clause 1, wherein the other UL control channel is scheduled using an indication received separately from the DL control channel.

Clause 3. The method of Clause 1 or 2, wherein the other UL control channel comprises: a UL control channel carrying acknowledgment (ACK) or negative ACK (NACK) feedback for a DL data channel configured using semi-persistent scheduling (SPS); or a UL control channel carrying periodic channel state information (P-CSI).

Clause 4. The method of any of Clauses 1-3, wherein the configured time period is dependent on content of the other UL control channel.

Clause 5. The method of any of Clauses 1-4, further comprising receiving an indication of a UL control channel resource set to be used for transmission of the other UL control channel, wherein the configured time period is dependent on the UL control channel resource set.

Clause 6. The method of any of Clauses 1-5, wherein the configured time period is configured as part of a configuration of the UL control channel resource set.

Clause 7. The method of any of Clauses 1-6, wherein the configured time period is dependent on a format of the other UL control channel.

Clause 8. The method of any of Clauses 1-7, wherein the configured time period is configured as a quantity of slots, a quantity of symbols, or absolute time.

Clause 9. The method of any of Clauses 1-8, wherein the configured time period is dependent on a capability of the UE.

Clause 10. The method of any of Clauses 1-9, wherein: the other UL control channel comprises a UL control channel for a DL data channel configured using SPS; and the configured time period is based on a timing associated with reception of the DL data channel.

Clause 11. The method of any of Clauses 1-10, wherein the configured time period is dependent on at least one of a frequency range, a frequency band, or subcarrier spacing (SCS) associated with the other UL control channel.

Clause 12. A method for wireless communication by a base station (BS), comprising: transmitting, on a downlink (DL) control channel, an indication of a configuration for repetition of a UL control channel, wherein the configuration is applied for repetition of another UL control channel after a configured time period starting from transmission of the DL control channel; and receiving the repetition of the UL control channel and the repetition of the other UL control channel in accordance with the configuration.

Clause 13. The method of Clause 12, wherein the other UL control channel is scheduled using an indication received separately from the DL control channel.

Clause 14. The method of Clause 12 or 13, wherein the other UL control channel comprises: a UL control channel carrying acknowledgment (ACK) or negative ACK (NACK) feedback for a DL data channel configured using semi-persistent scheduling (SPS); or a UL control channel carrying periodic channel state information (P-CSI).

Clause 15. The method of any of Clauses 12-14, wherein the configured time period is dependent on content of the other UL control channel.

Clause 16. The method of any of Clauses 12-15, further comprising transmitting an indication of a UL control channel resource set to be used by a user equipment (UE) for transmission of the other UL control channel, wherein the configured time period is dependent on the UL control channel resource set.

Clause 17. The method of Clause 16, wherein the configured time period is configured as part of a configuration of the UL control channel resource set.

Clause 18. The method of any of Clauses 12-17, wherein the configured time period is dependent on a format of the other UL control channel.

Clause 19. The method of any of Clauses 12-18, wherein the configured time period is configured as a quantity of slots, a quantity of symbols, or absolute time.

Clause 20. The method of any of Clauses 12-19, wherein the configured time period is dependent on a capability of a UE.

Clause 21. The method of any of Clauses 12-20, wherein: the other UL control channel comprises a UL control channel for a DL data channel configured using SPS; and the configured time period is based on a timing associated with transmission of the DL data channel.

Clause 22. The method of any of Clauses 12-21, wherein the configured time period is dependent on at least one of a frequency range, a frequency band, or subcarrier spacing (SCS) associated with the other UL control channel.

Clause 23. An apparatus, comprising: a memory; and one or more processors coupled to the memory, the memory and the one or more processors being configured to perform a method in accordance with any one of Clauses 1-22.

Clause 24. An apparatus, comprising means for performing a method in accordance with any one of Clauses 1-22.

Clause 25. A non-transitory computer-readable medium comprising executable instructions that, when executed by one or more processors of an apparatus, cause the apparatus to perform a method in accordance with any one of Clauses 1-22.

Clause 26. A computer program product embodied on a computer-readable storage medium comprising code for performing a method in accordance with any one of Clauses 1-22.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communications system 100.

In 3GPP, the term "cell" can refer to a coverage area of a Node B (NB) and/or a NB subsystem serving this coverage area, depending on the context in which the term is used. In NR systems, the term "cell" and base station (BS), next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by user equipments (UEs) with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS or a home BS.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with core network 190 through second backhaul links 184. BSs 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 gigahertz (GHz) unlicensed frequency spectrum as used by the Wi-Fi AP 150. Small cell 102', employing NR in an unlicensed frequency spectrum, may boost coverage to and/or increase capacity of the access network.

Some BSs, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave BS.

The communication links 120 between BSs 102 and, for example, UEs 104, may be through one or more carriers. For example, BSs 102 and UEs 104 may use spectrum up to Y megahertz (MHz) (e.g., 5, 10, 15, 20, 100, 400, and other MHz) bandwidth per carrier allocated in a carrier aggregation (CA) of up to a total of Yx MHz (x component carriers (CCs)) used for transmission in each direction. The carriers may or may not be adjacent to each other. Allocation of carriers may be asymmetric with respect to downlink (DL) and uplink (UL) (e.g., more or fewer carriers may be allocated for DL than for UL). The CCs may include a primary CC and one or more secondary CCs. A primary CC may be referred to as a primary cell (PCell), and a secondary CC may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communications system 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM)) to obtain an output sample stream. Each modulator may further process (e.g., convert to analog, amplify, filter, and upconvert) the output sample stream to obtain a downlink signal. DL signals from the modulators in transceivers 232a-232t may be transmitted via the antennas 234a-234t, respectively.

At UE 104, antennas 252a-252r may receive the DL signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the UL, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the UL signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the DL and/or UL.

5G may utilize OFDM with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communications system 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be CP-OFDM symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The SCS and symbol length/duration are a function of the numerology. The subcarrier spacing may be equal to $2^{\mu} \times 15$ kHz, where $\mu$ is the numerology 0 to 5. As such, the numerology $\mu=0$ has a SCS of 15 kHz and the numerology $\mu=5$ has a SCS of 480 kHz. The symbol length/duration is inversely related to the SCS. FIGS. 3A-3D provide an example of slot configuration 0 with 14 symbols per slot and numerology $\mu=2$ with 4 slots per subframe. The slot duration is 0.25 ms, the SCS is 60 kHz, and the symbol duration is approximately 16.67 μs.

A resource grid may be used to represent the frame structure. Each time slot includes a RB (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the BS. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a BS for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of techniques for control information transmission on a data channel in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another. In other words, unless a specific order of steps or actions is specified, the order and/or use of specific steps and/or actions may be modified. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication by a user equipment (UE), comprising:

receiving, on a downlink (DL) control channel, an indication of a configuration for repetition of an uplink (UL) control channel scheduled by the DL control channel and another UL control channel scheduled using an indication received separately from the DL control channel, wherein the configuration is applied for repetition of the other UL control channel configured for transmission via one of UL control channel formats after a configured time period starting from reception of the DL control channel, wherein different values of the configured time period are applicable for different types of content of the other UL control channel and different UL control channel formats used for transmission of the other UL control channel, and wherein a current value of the configured time period is based on a type of content of the other UL control channel and an UL control channel format used for transmission of the other UL control channel; and transmitting the repetition of the UL control channel and the repetition of the other UL control channel in accordance with the configuration.

2. The method of claim 1, wherein the other UL control channel comprises:
a UL control channel carrying acknowledgment (ACK) or negative ACK (NACK) feedback for a DL data channel configured using semi-persistent scheduling (SPS); or
a UL control channel carrying periodic channel state information (P-CSI).

3. The method of claim 1, further comprising receiving an indication of a UL control channel resource set to be used for transmission of the other UL control channel, wherein the configured time period is dependent on the UL control channel resource set.

4. The method of claim 3, wherein the configured time period is configured as part of a configuration of the UL control channel resource set.

5. The method of claim 1, wherein the configured time period is dependent on a format of the other UL control channel.

6. The method of claim 1, wherein the configured time period is configured as a quantity of slots, a quantity of symbols, or absolute time.

7. The method of claim 1, wherein the configured time period is dependent on a capability of the UE.

8. The method of claim 1, wherein:
the other UL control channel comprises a UL control channel for a DL data channel configured using SPS; and
the configured time period is based on a timing associated with reception of the DL data channel.

9. The method of claim 1, wherein the configured time period is dependent on at least one of a frequency range, a frequency band, or subcarrier spacing (SCS) associated with the other UL control channel.

10. A method for wireless communication by a base station (BS), comprising:
transmitting, on a downlink (DL) control channel, an indication of a configuration for repetition of an uplink (UL) control channel scheduled by the DL control channel and another UL control channel scheduled using an indication received separately from the DL control channel, wherein the configuration is applied for repetition of the other UL control channel configured for transmission via one of UL control channel formats after a configured time period starting from transmission of the DL control channel, wherein different values of the configured time period are applicable for different types of content of the other UL control channel and different UL control channel formats used for transmission of the other UL control channel, and wherein a current value of the configured time period is based on a type of content of the other UL control channel and an UL control channel format used for transmission of the other UL control channel; and
receiving the repetition of the UL control channel and the repetition of the other UL control channel in accordance with the configuration.

11. The method of claim 10, wherein the other UL control channel comprises:
a UL control channel carrying acknowledgment (ACK) or negative ACK (NACK) feedback for a DL data channel configured using semi-persistent scheduling (SPS); or
a UL control channel carrying periodic channel state information (P-CSI).

12. The method of claim 10, further comprising transmitting an indication of a UL control channel resource set to be used by a user equipment (UE) for transmission of the other UL control channel, wherein the configured time period is dependent on the UL control channel resource set.

13. The method of claim 12, wherein the configured time period is configured as part of a configuration of the UL control channel resource set.

14. The method of claim 10, wherein the configured time period is dependent on a format of the other UL control channel.

15. The method of claim 10, wherein the configured time period is configured as a quantity of slots, a quantity of symbols, or absolute time.

16. The method of claim 10, wherein the configured time period is dependent on a capability of a UE.

17. The method of claim 10, wherein:
the other UL control channel comprises a UL control channel for a DL data channel configured using SPS; and
the configured time period is based on a timing associated with transmission of the DL data channel.

18. The method of claim 10, wherein the configured time period is dependent on at least one of a frequency range, frequency band, or subcarrier spacing (SCS) associated with the other UL control channel.

19. An apparatus for wireless communication, comprising:
a memory comprising instructions; and
one or more processors configured to execute the instructions and cause the apparatus to:
receive, on a downlink (DL) control channel, an indication of a configuration for repetition of an uplink (UL) control channel scheduled by the DL control channel and another UL control channel scheduled using an indication received separately from the DL control channel, wherein the configuration is applied for repetition of another UL control channel configured for transmission via one of UL control channel formats after a configured time period starting from reception of the DL control channel, wherein different values of the configured time period are applicable for different types of content of the other UL control channel and different UL control channel formats used for transmission of the other UL control channel, and wherein a current value of the configured time period is based on a type of content of the other UL control channel and an UL control channel format used for transmission of the other UL control channel; and
transmit the repetition of the UL control channel and the repetition of the other UL control channel in accordance with the configuration.

20. The apparatus of claim 19, wherein the other UL control channel comprises:
a UL control channel carrying acknowledgment (ACK) or negative ACK (NACK) feedback for a DL data channel configured using semi-persistent scheduling (SPS); or
a UL control channel carrying periodic channel state information (P-CSI).

21. The apparatus of claim 19, wherein the one or more processors are further configured to execute the instructions and cause the apparatus to receive an indication of a UL control channel resource set to be used for transmission of the other UL control channel, wherein the configured time period is dependent on the UL control channel resource set.

22. An apparatus for wireless communication, comprising:
- a memory comprising instructions; and
- one or more processors configured to execute the instructions and cause the apparatus to:
  - transmit, on a downlink (DL) control channel, an indication of a configuration for repetition of an uplink (UL) control channel scheduled by the DL control channel and another UL control channel scheduled using an indication received separately from the DL control channel, wherein the configuration is applied for repetition of another UL control channel configured for transmission via one of UL control channel formats after a configured time period starting from transmission of the DL control channel, wherein different values of the configured time period are applicable for different types of content of the other UL control channel and different UL control channel formats used for transmission of the other UL control channel, and wherein a current value of the configured time period is based on a type of content of the other UL control channel and an UL control channel format used for transmission of the other UL control channel; and
  - receive the repetition of the UL control channel and the repetition of the other UL control channel in accordance with the configuration.

23. The apparatus of claim 22, wherein the other UL control channel comprises:
- a UL control channel carrying acknowledgment (ACK) or negative ACK (NACK) feedback for a DL data channel configured using semi-persistent scheduling (SPS); or
- a UL control channel carrying periodic channel state information (CSI).

* * * * *